United States Patent
Yoo

(10) Patent No.: US 10,250,398 B2
(45) Date of Patent: *Apr. 2, 2019

(54) TERMINAL AND METHOD FOR MEASURING DATA USAGE

(71) Applicant: Pantech Inc., Seoul (KR)

(72) Inventor: Jung Im Yoo, Seoul (KR)

(73) Assignee: Pantech Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,594

(22) Filed: Aug. 22, 2016

(65) Prior Publication Data

US 2016/0360392 A1 Dec. 8, 2016

Related U.S. Application Data

(63) Continuation of application No. 13/251,416, filed on Oct. 3, 2011, now Pat. No. 9,426,039.

(30) Foreign Application Priority Data

Dec. 27, 2010 (KR) ........................ 10-2010-0135729

(51) Int. Cl.
*H04L 12/14* (2006.01)
*H04L 12/24* (2006.01)
(Continued)

(52) U.S. Cl.
CPC ...... *H04L 12/1432* (2013.01); *H04L 12/1417* (2013.01); *H04L 41/5025* (2013.01);
(Continued)

(58) Field of Classification Search
CPC ............. H04L 12/1417; H04L 12/1432; H04L 12/1435; H04L 41/5025; H04L 67/146;
(Continued)

(56) References Cited

U.S. PATENT DOCUMENTS 7,454,215 B2 11/2008 Hamano et al.
7,778,660 B2 8/2010 Morota et al.
(Continued)

FOREIGN PATENT DOCUMENTS

JP 2003-143332 5/2003
JP 2005-167344 6/2005
(Continued)

OTHER PUBLICATIONS

The Extended European Search Report dated Oct. 28, 2014 in European Patent Application No. 11187610.8.
(Continued)

*Primary Examiner* — Stephen J Clawson
(74) *Attorney, Agent, or Firm* — H.C. Park & Associates, PLC

(57) ABSTRACT

In a mobile terminal and method, the mobile terminal and method calculate a usage amount of data for each application executed in the mobile terminal. The mobile terminal includes: a communication unit to communicate to a server; a recognition unit to recognize an application sending a data communication connection request; a calculation unit to calculate a usage amount of data communicated by the application sending the data communication connection request; and a control unit to control the mobile terminal based on the calculation and of data usage for the application.

15 Claims, 5 Drawing Sheets

(51) Int. Cl.
  *H04M 15/00* (2006.01)
  *H04L 29/08* (2006.01)
  *H04M 1/725* (2006.01)
  *H04W 36/00* (2009.01)
  *H04W 4/24* (2018.01)
  *H04W 4/00* (2018.01)
  *H04W 24/00* (2009.01)

(52) U.S. Cl.
  CPC ...... *H04L 67/146* (2013.01); *H04M 1/72577* (2013.01); *H04M 15/58* (2013.01); *H04W 4/24* (2013.01); *H04W 36/0022* (2013.01); *H04L 12/1435* (2013.01); *H04W 4/00* (2013.01); *H04W 24/00* (2013.01)

(58) Field of Classification Search
  CPC . H04M 15/58; H04M 1/72577; H04W 24/00; H04W 36/0022; H04W 4/00; H04W 4/26
  USPC .......................................................... 370/253
  See application file for complete search history.

(56) References Cited

U.S. PATENT DOCUMENTS

| | | | |
|---|---|---|---|
| 7,817,983 | B2 | 10/2010 | Cassett et al. |
| 7,974,616 | B1 | 7/2011 | Urbanek |
| 8,176,176 | B1 | 5/2012 | Chan |
| 2002/0022471 | A1 | 2/2002 | Watler et al. |
| 2002/0116500 | A1* | 8/2002 | Arora ...................... H04L 29/06 709/227 |
| 2002/0168959 | A1 | 11/2002 | Noguchi et al. |
| 2003/0078037 | A1 | 4/2003 | Auckland et al. |
| 2004/0186777 | A1 | 9/2004 | Margiloff et al. |
| 2004/0246920 | A1 | 12/2004 | Savolainen |
| 2005/0026592 | A1 | 2/2005 | Walter et al. |
| 2005/0215238 | A1 | 9/2005 | Macaluso |
| 2007/0038764 | A1* | 2/2007 | Maillard ............. H04L 12/5692 709/229 |
| 2008/0183887 | A1 | 7/2008 | Klemets |
| 2008/0214191 | A1* | 9/2008 | Yach ................. H04M 1/72519 455/435.2 |
| 2008/0281699 | A1* | 11/2008 | Whitehead ............. G06Q 30/02 705/14.41 |
| 2010/0022216 | A1 | 1/2010 | Bandera et al. |
| 2010/0192212 | A1 | 7/2010 | Raleigh |
| 2010/0217855 | A1* | 8/2010 | Przybysz ............. H04W 28/16 709/223 |
| 2011/0053513 | A1 | 3/2011 | Papakostas et al. |
| 2011/0275344 | A1* | 11/2011 | Momtahan .............. H04L 12/14 455/405 |
| 2011/0317631 | A1* | 12/2011 | Navda ............... H04W 72/1231 370/329 |
| 2012/0196646 | A1 | 8/2012 | Crinon et al. |
| 2014/0313962 | A1 | 10/2014 | Jaakkola |

FOREIGN PATENT DOCUMENTS

| | | |
|---|---|---|
| JP | 2007-081950 | 3/2007 |
| JP | 2009-005162 | 1/2009 |
| JP | 2010-104066 | 5/2010 |
| WO | 2004/023741 | 3/2004 |
| WO | 2006105301 | 10/2006 |
| WO | 2010128391 | 11/2010 |

OTHER PUBLICATIONS

IEEE Std 802.11a-1999(R2003), Supplement to IEEE Standard for Information technology, Telecommunications and information exchange between systems, Local and metropolitan area networks, Specific requirements, Part 11: Wireless LAN Medium Access Control (MAC) and Physical Layer (PHY) specifications, High-speed Physical Layer in the 5 GHz Band; IEEE-SA Standards Board; reaffirmed Jun. 12, 2003.
IEEE Std 802.11b-1999/Cor Jan. 2001 (Corrigendum to IEEE Std 802.11b-1999), IEEE Standard for Information technology, Telecommunications and information exchange between systems, Local and metropolitan area networks, Specific requirements, Part 11: Wireless LAN Medium Access Control (MAC) and Physical Layer (PHY) specifications, Amendment 2: Higher-speed Physical Layer (PHY) extension in the 2.4 GHz band, Corrigendum 1; IEEE; Nov. 7, 2001.
Brinkmann, "Anvir Task Manager Review", gHacks Tech News, Jan. 13, 2010.
Hoffman, "Why You Don't Need Third Party Apps to Manage Background Data Use in Android Jelly Bean", Apr. 10, 2013.
Dictionary.com, [retrieved on Apr. 7, 2016], Retrieved from the Internet: <http:/www.dictionary.com/browser/control-unit>.
Non-Final Office Action dated Aug. 6, 2013 in U.S. Appl. No. 13/251,416.
Non-Final Office Action dated Aug. 22, 2014 in U.S. Appl. No. 13/251,416.
Final Office Action dated Jan. 5, 2015 in U.S. Appl. No. 13/251,416.
Non-Final Office Action dated Jul. 15, 2015 in U.S. Appl. No. 13/251,416.
Final Office Action dated Jan. 26, 2016 in U.S. Appl. No. 13/251,416.
Notice of Allowance dated Apr. 19, 2016 in U.S. Appl. No. 13/251,416.

* cited by examiner

TERMINAL AND METHOD FOR MEASURING DATA USAGE

CROSS-REFERENCE TO RELATED APPLICATION

This application is a continuation of U.S. patent application Ser. No. 13/251,416, filed on Oct. 3, 2011, and claims priority from and the benefit under 35 U.S.C. § 119(a) of Korean Patent Application No. 10-2010-0135729, filed on Dec. 27, 2010, which is hereby incorporated by reference for all purposes as if fully set forth herein.

BACKGROUND

Field

Exemplary embodiments of the present invention relate to a terminal and method for measuring data usage, and specifically a terminal and method for measuring data usage that may be applied to various applications and advertisement widgets in a mobile terminal device.

Discussion of the Background

With the recent rapid development of wireless network technology and infrastructures thereof, people can obtain desired data whenever and wherever wireless network service is provided using mobile terminals such as smartphones, notebooks, and PDAs. Particularly, in the case of smartphones, a mobile communication network of a 3G or Wi-Fi type may be used in order to transmit and receive data. In the case of Wi-Fi, the cost of data communication may not increase according to the amount of data communicated. However, in the case of 3G, increased data communication may result in higher costs to a user.

Therefore, applications have been introduced that inform the user of a 3G data usage amount and cost information. When such an application is executed, it is connected to a server of a communication service provider and displays a 3G data usage amount and cost information. However, such applications only provide the total usage amount of 3G data used.

SUMMARY

The following description relates to a terminal and method for measuring data usage, including a terminal and method for measuring data usage that may be applied to various applications and advertisement widgets in a mobile terminal device. Exemplary embodiments may also be directed to a display that displays a usage amount of data per application.

Additional features of the invention will be set forth in the description which follows, and in part will be apparent from the description, or may be learned by practice of the invention.

An exemplary embodiment provides a mobile terminal that includes a communication unit to communicate data to and from a server of a communication service provider; a recognition unit to recognize a first application and a second application that communicates data via the communication unit; a calculation unit for calculating a usage amount of data communicated to and from the server for the first application; and a control unit to control the mobile terminal based on the usage amount of data for the application.

An exemplary embodiment provides a method controlling a mobile terminal including sensing data communicated from the mobile terminal to and from a server of a communication service provider; recognizing a first application and a second application that communicates data to and from the server; calculating a usage amount of data for the first application; and controlling the mobile terminal based on the usage amount of data.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
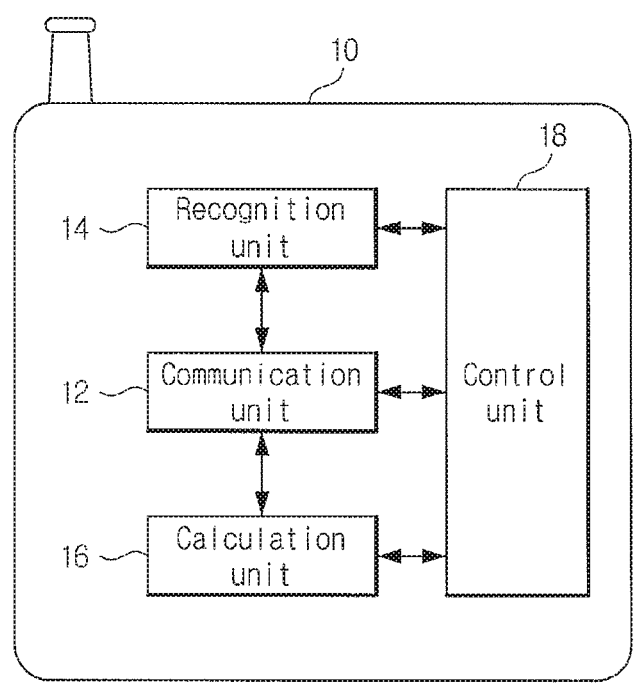
FIG. 1 is a diagram illustrating a configuration of a mobile terminal according to an exemplary embodiment.

FIG. 1 is a diagram illustrating a configuration of a mobile terminal according to an exemplary embodiment.

Referring to FIG. 1, a mobile terminal 10 may include a communication unit 12, a recognition unit 14, a calculating unit 16, and a control unit 18.

The communication unit 12 transmits and receives data to and from a server of a communication service provider, and may be include or be incorporated with a built-in antenna. In addition, data communicated from a mobile terminal to a server may be in the form of packets.

The recognition unit 14 recognizes an application that transmits a data communication connection request and a data communication disconnection request to the communication unit 12. If the terminal 10 requests a data communication connection to, or a disconnection from the server of the communication service provider, in a wireless network, such as a 3G system, 4G system, LTE system, or the like, the recognition unit 14 detects the application that makes the request.

The calculation unit 16 calculates a usage amount of data transmitted to and received from the server of the communication service provider via the communication unit 12.

The control unit 18 calculates the usage amount of data by using the calculation unit 16 until a data communication disconnection is requested, which occurs after the corresponding data communication connection is requested by an application recognized by the recognition unit 14. The control unit 18 may also control the mobile terminal 10 depending on the usage amount of data for each application.

There are various techniques of controlling the mobile terminal 10 by the control unit 18 based on the usage amount of data for each application, and examples will be described in more detail with reference to FIG. 2, FIG. 3, FIG. 4 and FIG. 5.

In the following description, a data communication networks used by the mobile terminal 10 are based on 3G and Wi-Fi, which are standards for mobile communication networks. That is, a basic data communication network used for executing each application is 3G, and Wi-Fi is used as an auxiliary data communication network in cases where 3G is inaccessible or in a case where the device is switched to Wi-Fi, either automatically upon a condition or upon a user's selection.

The mobile communication network described in the exemplary embodiment is not limited to 3G networks. The mobile communication network used with the exemplary embodiment may be a 3G network, such as WCDMA, HSDPA, CDMA2000, and Wibro; or a 4G standard network or competing 4G network, such as WiMax, LTE (Long Term Evolution), and LTE-Advanced.

The ITU defines 4G as a mobile communication method in which i) the maximum download speed is 100 Mbps or higher, ii) the system is completely based on IP, and iii) the orthogonal frequency-division multiplexing (OFDM) technique is employed. The mobile communication network according to the exemplary embodiment includes 4G communication methods that comply with the ITU definition, and may include a communication method that complies with one or more of the ITU definition sub-parts.

Figure 2:
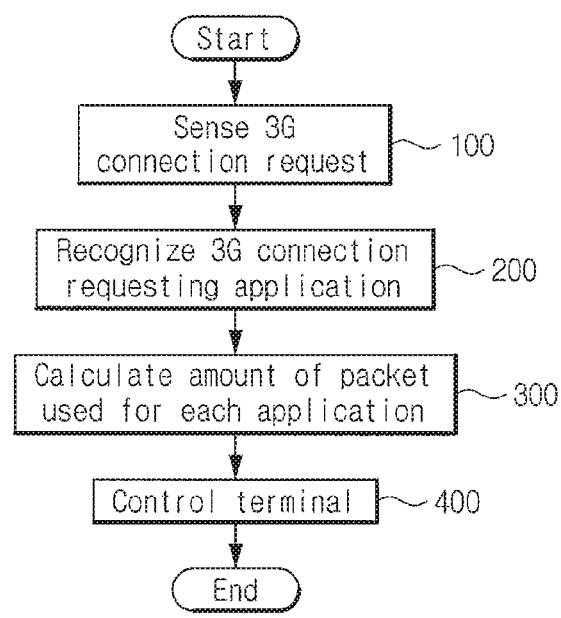
FIG. 2 is a flowchart showing a method for controlling a mobile terminal according to an exemplary embodiment.

FIG. 2 is a flowchart showing a method for controlling a mobile terminal according to an exemplary embodiment.

Referring to FIG. 2, the mobile terminal 10 may sense that a particular application or element in the mobile terminal 10 activates or makes a 3G connection request (100). The control unit 18 may recognize the sensed application as the application that requests a data communication connection to the server of the communication service provider via the communication unit 12 (200).

If an application is recognized, the control unit 18 senses whether packet information is received at the mobile terminal 10, and calculates a usage amount of packets for each application using the calculation unit 16 (300). Specifically, the control unit 18 causes the calculation unit 16 to calculate the usage amount of packets for each application by calculating the amount of packets used for each application until the 3G connection is terminated. If the usage amount of packets for each application is calculated, the control unit 18 may control the mobile terminal 10 on the basis of the calculated usage amount of 3G used for each application (400).

An example of a type of control performed by a mobile terminal 10 may include controlling a display unit (not shown), which may be included in the mobile terminal 10, to display the usage amount of 3G for each application.

Figure 3:
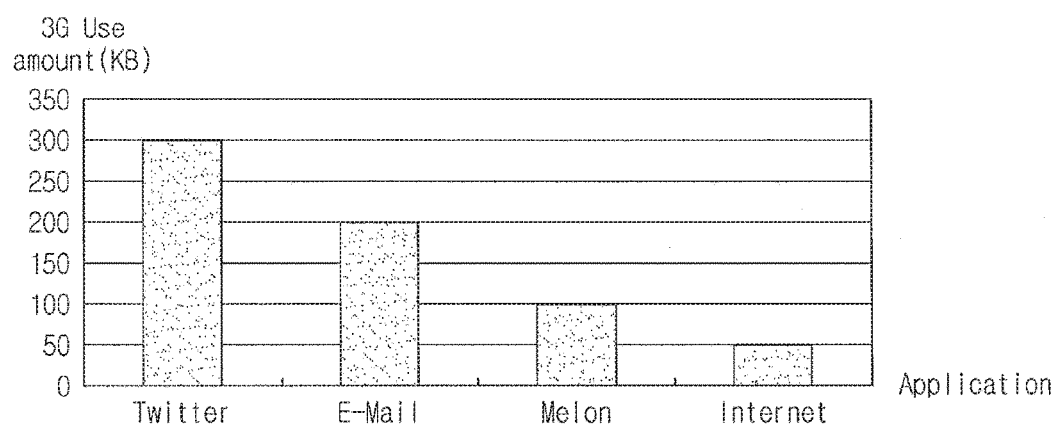
FIG. 3 is a diagram showing a usage amount of data used for each application displayed on a display unit of a mobile terminal according to an exemplary embodiment.

FIG. 3 is a diagram showing a usage amount of data used for each application displayed on a display unit of a mobile terminal according to an exemplary embodiment.

The mobile terminal 10 may contain an application to display the usage amount of 3G for each application. A user may determine the usage amount of 3G for each application and information related to the cost of the usage of each application, by executing a specific application or a widget of the application.

If this application for determining usage or costs is executed, the application synchronizes with the server of the communication service provider, and thus the usage amount of data and the cost information may be verified. If a widget is executed, the widget synchronizes with the server of the communication service provider at time intervals, and thus, the usage amount of data and cost information may be produced.

Referring to FIG. 3, the usage amount of data for sample applications, such as Twitter, e-mail, Melon, and Internet are shown as a bar graph. Although not shown in FIG. 3, this data may be displayed in various forms, such as a pie graph and the like. In addition, a graphical representation of the cost information associated with various applications may also be shown. The type of data shown, and the form of the graph may be customized.

A payment reference for a usage amount of data, which serves as a basis for determining cost information associated with each application and that may be displayed on a graph (as explained above), may be set according to a rate provided by a server of the communication service provider (e.g., 1 dollar per 1 MB). Further, a payment system amongst various payment systems that may be stored in a database, may be selected, with the display of the cost information in the graph being based on the selection.

Further, there may be a free-of-charge application which is provided free of charge from the communication service provider. Thus, in certain cases, even if the usage amount of data is provided, the accurate cost information may not be provided.

Therefore, the mobile terminal 10 according to an exemplary embodiment may exclude the usage amount of data by a free-of-charge application when calculating the usage amount of data for an applicable application. Accordingly, the cost information may also exclude free-of-charge applications, and reflect only the usage amount of data for other applications.

Based on settings, both the usage amount of data for free-of-charge applications and the usage amount of data for non free-of-charge applications may be included, with the cost information including only the usage amount for the non free-of-charge applications.

Figure 4:
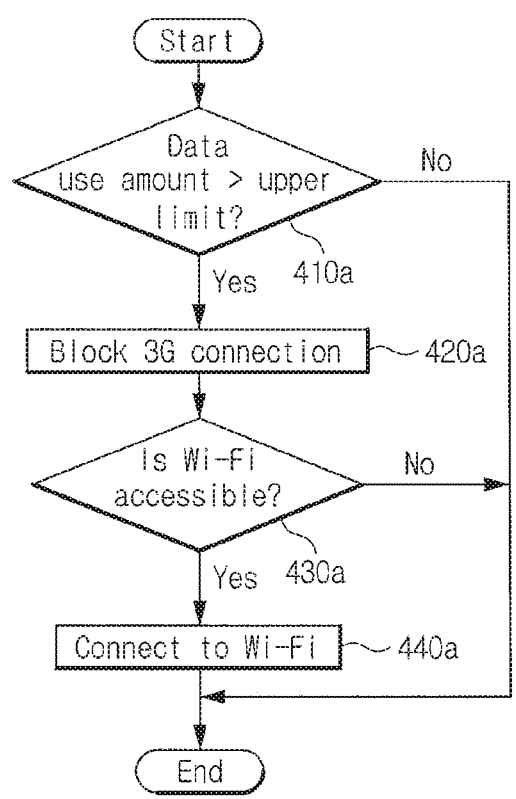
FIG. 4 is a flowchart showing a method for controlling an application based on data used according to an exemplary embodiment.

FIG. 4 is a flowchart showing a method for controlling an application based on data used according to an exemplary embodiment. Specifically, FIG. 4 shows an example of the terminal control process 400 of FIG. 2 in more detail.

Due to the mobile terminal 10 being able to calculate and store the usage amount of data for each application (as explained above), the mobile terminal 10 may also set an upper limit of a usage amount of data for each application, and if a usage amount of data exceeds the upper limit for a corresponding application, the mobile terminal 10 may block or limit the 3G connection access of the corresponding application, and/or may cause a switchover to a connection to Wi-Fi for only the corresponding application or for all data communications.

Referring to FIG. 4, the control unit 18 determines whether the usage amount of data for each application is greater than the upper limit of a usage amount, which may be set in advance (410a). If the determination is that the data usage exceeds the upper limit, the 3G connection is blocked for at least the corresponding application (420a).

The control unit 18 may determine whether a current location of the mobile terminal 10 is in a Wi-Fi accessible range (430a). If the location is in a Wi-Fi accessible range, the mobile terminal 10 may switch to a state of being connected to a Wi-Fi network, in order to transmit and receive data (440a). If the location is not in a Wi-Fi accessible range, the mobile terminal 10 may block the 3G connection for only the corresponding application having a usage amount of data that is greater than the upper limit of the usage amount. Other applications may continue to access the 3G connection.

As explained, the mobile terminal 10 according to an exemplary embodiment may perform the above-described control specifically and individually for each application.

The mobile terminal 10 may also be controlled based on the amount of usage data for individual features. Some examples of features may include: synchronization data for each application for performing synchronization with the server, necessary data transmitted and received for the executed applications, and advertisement data, and the like.

An extracted packet sample may be used for determining the feature associated with various amounts of usage data. The packets, as they are being transmitted or received, may be examined in real time, with the packets received for each application examined at specific time intervals and stored. Thus, the feature associated with the data currently being transmitted or received may be determined by the examined packets. In addition, if an internet web browser is executed or the like, the features of the used data may be determined by analyzing packets whenever the mobile terminal 10 switches to the web browser or the executed application.

If the packet sample is extracted in various methods as described above, features of each application may be determined with reference to ratios using a combination of the synchronization data, the necessary data and the advertising data.

The control unit 18 may determine a packet that is used at specific time intervals or in a background packet, as synchronization data. Further, the control unit 18 may determine packets used in a foreground as necessary data.

Here, the "background use packet" refers to the data used in situations where an application is not being actively used by a user. This is due to applications, such as widgets that transmit and receive synchronization data to and from the server, updating at various time periods, which may be set in advance.

The "foreground use packet" refer to the data used if an application is being executed and available to be actively used by a user, such as an open web browser.

In addition, the control unit 18 may determine advertising data by filtering URL information or file format information on the used packets. The filtering technique and parameters may be set in advance.

That is, if advertising data is transmitted and received, the URL information may include a trigger word, such as "ad", specific tag information, or image formats, such as a flash banner file. By storing these in a database and filtering these elements, data or packets may be identified as advertisements.

Once the type of data is determined as described above, various controls of the data communication associated and allowed with each application may be performed. For example, if the ratio of the amount of advertising data to the amount of application data is equal to or greater than a threshold value, the control unit 18 may determine that the application is an advertising application.

Figure 5:
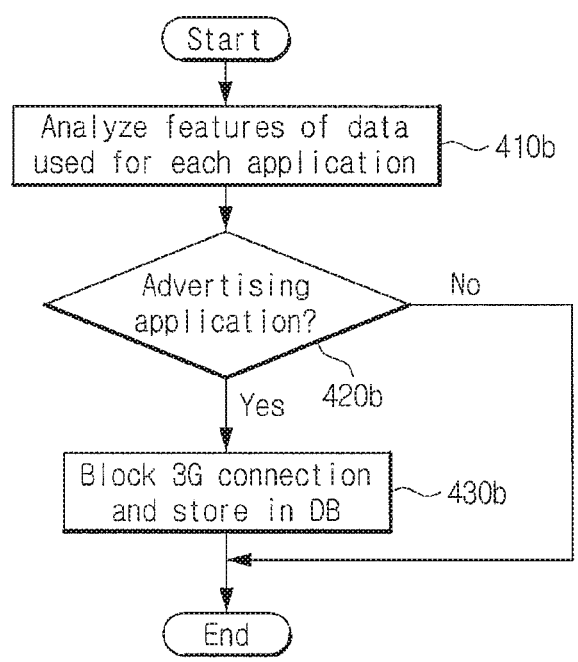
FIG. 5 is a flowchart showing a method for controlling an advertising application according to an exemplary embodiment.

FIG. 5 is a flowchart showing a method for controlling an advertising application according to an exemplary embodiment.

Referring to FIG. 5, the control unit 18 analyzes features for each application, by analyzing the data or the packets and identifying a type of application associated with the data and/or packets (410b). After which, the control unit 18 determines whether the corresponding application is an advertising application (420b). This may be done using the technique described above.

If the corresponding application is determined to be an advertising application, the 3G connection may be blocked, and the corresponding application may be stored as an advertising application in a database (430b), and subsequently blocked from future usage with a 3G connection.

Although not shown in FIG. 5, alternatively or additionally, the control unit 18 may display a warning message and/or a pop-up window on the display unit to notify a user if the application is identified as an advertising application, and to allow the user to select whether to continue or block the 3G data connection for the advertising application.

In addition, if two or more applications request a data communication connection at or near the same time, the control unit 18 may connect the application that is not identified as an advertising application first or sets the order of connection based on the ratio of data that is associated with advertising data.

In addition, if a load of the control unit 18 is higher than a threshold value, the control unit 18 may block the data communication connection of the applications that have been identified as advertising applications. Thus, an excessive load on the control unit, such as a CPU, may be reduced.

The application identified as an advertising application may be blocked if trying to access a 3G network in the background, thus preventing applications identified as advertising applications from using data communications without a user's knowledge or intention. In addition, blocking of 3G network access may be set depending on time, URLs, and foreground/background states of applications, as well as depending on the applications. In addition, if an application is executed, the amount of data used by the executed application and cost information may be simultaneously displayed on the display unit. In addition, various control operations relating to data communication connection and provision of particular user interfaces may also be performed on the basis of the usage amount of data for each application.

The mobile terminal 10 and the method thereof according to this disclosure calculates the usage amount of data for each application and provides the calculated usage amount, so that the management of cost information, battery consumption information, and CPU load information may more efficiently be tracked and used.

In an exemplary embodiment, the usage amount of data for each application is displayed, so as to allow or block data communication connection selectively for each application, so that a cost of operating and a power consumption of a mobile terminal, such as a smartphone, may be reduced or managed.

In addition, as data usage amount information for each application is provided, each application may be used more interactively.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling a mobile terminal, the method comprising:
    sensing data communicated from the mobile terminal to a server of a communication service provider or from the server to the mobile terminal;
    recognizing applications that communicate data to and from the server;
    calculating a usage amount of the communicated data for the respective applications;
    identifying types of the communicated data for the respective applications, where a first type data is selected from the group consisting of synchronization data and advertising data;
    controlling the mobile terminal based on usage amounts of data and the types of data; and
    displaying the usage amount of the communicated data for the respective applications,
    wherein the controlling of the mobile terminal comprising:
        categorizing that an application is a first type application based on a ratio of a usage amount of the first type data to a usage amount of total data for the application being equal to or greater than a threshold value, and
        blocking the application from data communication based on the application being categorized as the first type application
    wherein the first type data are extracted from packets of data for the application.

2. The method according to claim 1, wherein the first type data comprise at least one of synchronization data and advertising data, and
    wherein the synchronization data are communicated when the application is operating in a background state.

3. The method according to claim 1, further comprising:
    determining whether a usage amount of data of an executing application exceeds a threshold; and
    blocking the executing application from data communication when the usage amount of data of the executing application exceeds the threshold.

4. The method according to claim 1, further comprising:
    determining whether a usage amount of data of an executing application exceeds a threshold;
    determining whether a current location of the mobile terminal is in range of a IEEE 802.11 wireless area network (WLAN) when the usage amount of data for the executing application exceeds the threshold; and
    connecting to the WLAN when the current location of the mobile terminal is in range of the WLAN.

5. The method according to claim 1, wherein calculating the usage amount of the communicated data further comprises:
    excluding usage amount of data for a free-of-charge application.

6. The method according to claim 1, wherein the first type data is advertising data.

7. A mobile terminal, comprising:
    a communication unit to communicate data to and from a server of a communication service provider, the communication unit comprising an antenna;
    a processor; and
    a display,
    wherein the processor is configured to:
        recognize applications that communicate data via the communication unit;
        calculate a usage amount of data communicated to and from the server for the respective applications;
        analyze the communicated data of the applications and identify types of the communicated data for the respective applications, where a first type data is selected from the group consisting of synchronization data and advertising data; and
        control the mobile terminal by controlling data communicated through the communication unit, based on usage amounts of data and the types of data, wherein the display displays the usage amount of data for the respective applications, wherein the processor is configured to categorize that an application is a first type application based on a ratio of a usage amount of the first type data to a usage amount of total data for the application being equal to or greater than a threshold value,
    wherein the first type data are extracted from packets of data for the application, and
    wherein the processor is configured to block the application from data communication based on the application being categorized as the first type application.

8. The mobile terminal according to claim 7, wherein the first type data comprise at least one of synchronization data and advertising data, and
    wherein background synchronization data are communicated when the application is operating in a background state.

9. The mobile terminal according to claim 7, wherein the processor is configured to block communications to and from an executing application based on a determination that a usage amount of data for the executing application exceeds a threshold.

10. The mobile terminal according to claim 7, wherein the processor is configured to determine whether a current location of the mobile terminal is in range of a IEEE 802.11 wireless local area network (WLAN) if a usage amount of data of an executing application exceeding a threshold.

11. The mobile terminal according to claim 7, wherein the processor is configured to connect to a IEEE 802.11 wireless local area network (WLAN) based on a current location of the mobile terminal being in range of the WLAN.

12. The mobile terminal according to claim 7, wherein the processor is configured to calculate a usage amount of data according to the identified types, and control the mobile terminal based on the usage amount of data according to the identified types.

13. The mobile terminal according to claim 7, wherein the processor is configured to filter URL information or file format information to identify a packet of data as the first type data.

14. The mobile terminal according to claim 7, wherein the processor is configured to display a warning message or a pop-up window on the display based on execution of the first type application.

15. The mobile terminal according to claim 7, wherein the first type data is advertising data.

* * * * *